(12) United States Patent
Chang (10) Patent No.: US 8,171,307 B1
(45) Date of Patent: May 1, 2012

(54) BACKGROUND ENCRYPTION OF DISKS IN A LARGE CLUSTER

(75) Inventor: Steven Chang, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 1296 days.

(21) Appl. No.: 11/420,723

(22) Filed: May 26, 2006

(51) Int. Cl.
*G06F 21/00* (2006.01)

(52) U.S. Cl. ......... 713/189; 380/28; 380/239; 380/259; 709/213; 709/250; 713/150; 713/165; 713/182; 713/193; 726/2

(58) Field of Classification Search .............. 713/189
See application file for complete search history.

(56) References Cited

U.S. PATENT DOCUMENTS

| | | | |
|---|---|---|---|
| 1,310,719 A | 7/1919 | Vernam | |
| 4,262,329 A | 4/1981 | Bright et al. | |
| 4,558,176 A | 12/1985 | Arnold et al. | |
| 4,757,533 A | 7/1988 | Allen et al. | |
| 5,185,717 A | 2/1993 | Mori | |
| 5,235,641 A | 8/1993 | Nozawa | |
| 5,265,159 A | 11/1993 | Kung | |
| 5,677,952 A | 10/1997 | Blakeley, III et al. | |
| 5,687,237 A | 11/1997 | Naclerio | |
| 5,870,468 A | 2/1999 | Harrison | |
| 5,931,947 A | 8/1999 | Burns | |
| 5,933,498 A | 8/1999 | Schneck et al. | |
| 5,940,507 A | 8/1999 | Cane | |
| 6,073,237 A | 6/2000 | Ellison | |
| 6,134,660 A * | 10/2000 | Boneh et al. ............... | 713/193 |
| 6,212,600 B1 | 4/2001 | Friedman et al. | |
| 6,249,866 B1 | 6/2001 | Brundrett | |
| 6,345,101 B1 | 2/2002 | Shukla | |
| 6,356,941 B1 | 3/2002 | Cohen | |
| 6,405,315 B1 | 6/2002 | Burns et al. | |
| 6,414,884 B1 | 7/2002 | DeFelice et al. | |
| 6,507,911 B1 | 1/2003 | Langford | |
| 6,550,011 B1 | 4/2003 | Sims, III | |
| 6,625,734 B1 | 9/2003 | Marvit et al. | |
| 6,684,222 B1 | 1/2004 | Cornelius et al. | |
| 6,735,693 B1 | 5/2004 | Hamlin | |
| 6,745,310 B2 * | 6/2004 | Chow et al. ............... | 711/170 |
| 6,754,827 B1 | 6/2004 | Cane et al. | |

(Continued)

FOREIGN PATENT DOCUMENTS

WO    WO 00/52875 A1    9/2000

(Continued)

OTHER PUBLICATIONS

A Scalable Group Rekeying Scheme using Secret Mask Patterns|http://dl.acm.org/citation.cfm?id=977394.977500|Yaser M. Asem & A. Kara|vol. 2|2004.*

(Continued)

*Primary Examiner* — Taghi Arani
*Assistant Examiner* — Mahfuzur Rahman
(74) *Attorney, Agent, or Firm* — Cesari and McKenna, LLP (57) ABSTRACT

The invention provides for rekeying a large cluster of storage security appliances which allows more than two of the storage security appliances to proxy a single storage medium while encrypting the storage medium in a manner that is transparent to any attached server. The invention provides a method for synchronizing encryption of the disk among a large cluster of storage security appliances, while allowing all of the storage security appliances involved to access the storage device being rekeyed in a secure fashion.

20 Claims, 6 Drawing Sheets

U.S. PATENT DOCUMENTS

| | | | |
|---|---|---|---|
| 6,792,544 | B2 | 9/2004 | Hashem et al. |
| 6,839,437 | B1 | 1/2005 | Crane et al. |
| 6,851,056 | B2 | 2/2005 | Evans |
| 6,857,076 | B1 | 2/2005 | Klein |
| 6,915,435 | B1 | 7/2005 | Merriam |
| 7,003,674 | B1 | 2/2006 | Hamlin |
| 7,020,779 | B1 | 3/2006 | Sutherland |
| 7,093,127 | B2 | 8/2006 | McNulty et al. |
| 7,096,355 | B1 | 8/2006 | Marvit et al. |
| 7,197,638 | B1* | 3/2007 | Grawrock et al. ............ 713/165 |
| 7,215,771 | B1 | 5/2007 | Hamlin |
| 7,240,197 | B1 | 7/2007 | Yamagami et al. |
| 7,260,724 | B1 | 8/2007 | Dickinson et al. |
| 7,370,163 | B2* | 5/2008 | Yang et al. .................... 711/162 |
| 7,428,602 | B2* | 9/2008 | Vageline et al. .................. 710/8 |
| 7,496,718 | B2* | 2/2009 | Ohno et al. .................... 711/152 |
| 7,801,871 | B2* | 9/2010 | Gosnell .......................... 707/698 |
| 7,860,246 | B2* | 12/2010 | Cerruti et al. .................... 380/42 |
| 2001/0054155 | A1 | 12/2001 | Hagan et al. |
| 2002/0016827 | A1* | 2/2002 | McCabe et al. ............... 709/213 |
| 2002/0055989 | A1* | 5/2002 | Stringer-Calvert et al. ... 709/220 |
| 2002/0073324 | A1 | 6/2002 | Hsu |
| 2003/0018813 | A1* | 1/2003 | Antes et al. .................... 709/245 |
| 2003/0028765 | A1 | 2/2003 | Cromer et al. |
| 2004/0030852 | A1* | 2/2004 | Coombs et al. ............... 711/162 |
| 2005/0257062 | A1 | 11/2005 | Ignatius et al. |
| 2006/0015502 | A1* | 1/2006 | Szucs ................................ 707/9 |
| 2006/0126850 | A1 | 6/2006 | Dawson et al. |
| 2006/0136735 | A1* | 6/2006 | Plotkin et al. .................. 713/182 |
| 2006/0218647 | A1* | 9/2006 | Hars et al. ........................ 726/27 |
| 2006/0259525 | A1* | 11/2006 | Bae et al. ....................... 707/202 |
| 2007/0038857 | A1* | 2/2007 | Gosnell .......................... 713/165 |
| 2007/0058801 | A1 | 3/2007 | Plotkin |
| 2007/0174634 | A1 | 7/2007 | Plotkin |

FOREIGN PATENT DOCUMENTS

WO          WO 02/093314 A2    11/2002

OTHER PUBLICATIONS

Garfinkel, S., "PGP: Pretty Good Privacy," O'Reilly & Associates, pp. 43 and 65-67, Jan. 1995.
Garfinkel, S., "PGP: Pretty Good Privacy," O'Reilly & Associates, pp. 54-55, 151-153, Jan. 1995.
Menezes et al., "Handbook of Applied Cryptography," CRC Press, Section 13.7.1, 4 pages, 1997.
Schneier, "Applied Cryptography Second Edition: Protocols, Algorithms, and Source Code in C," John Wiley & Sons, Inc. pp. 5, 15, 179-181, 185, 213-214, 225, 229, 563-566 and 569. 1996.
Common Internet File System (CIFS) Version: CIFS-Spec 1.0, Storage Networking Industry Association (SNIA), SNIA CIFS Documentation Work Group, Revision Date: Mar. 1, 2002.
Shepler et al., (Apr. 2003) Internet Engineering Task Force (IETF) Request for Comments (RFC) 3530, Network File System (NFS) version 4 Protocol.
Callaghan et al., (Jun. 1995) Internet Engineering Task Force (IETF) Request for Comments (RFC) 1813, Network File System (NFS) version 3 Protocol.
Callaghan, "NFS Ilustrated," Addison Wesley Longman, Inc, 2000, pp. 277-290.
Anderson et al., "The Steganographic File System," Information Hiding, Second International Workshop, IH '98 Portland, Oregon. USA, Apr. 14-17, 1998, Proceedings, pp. 73-82, 1998.
Antonelli, et al., "The Packet Vault: Secure Storage of Network Data," CITI Technical Report 98-5, pp. 1-15, Jun. 25. 1998.
Blaze, "Oblivious Key Escrow," Information Hiding, First International Workshop, Cambridge, UK, May 3D-Jun. 1, 1996, Proceedings, pp. 335-343, 1996.
Blaze, "A cryptographic File System for Unix," Proceedings of the First ACM Conference on Computer and Communications Security, pp. 9-16 (1993).
Blaze, "Key Management in an Encrypting File System," USENIX Summer 1994 Technical Conference, pp. 27-35, (Jun. 6-10, 1994).
Boneh, et al., "A Revocable Backup System," In Proceedings 6th USENIX Security Conference, pp. 91-96, 1996.
Cattaneo, et al. "The Design and Implementation of a Transparent Cryptographic Filesystem for UNIX," Proceedings of the FREENIX Track: 2001 UNIX Annual Technical Conference. pp. 199-212 (Jun. 25-30. 2001).
Christy, et al., "Mechanism for Secure Off-Site Computer Access," IBM Technical Disclosure Bulletin. pp. 6754-6756. Apr. 1985.
Clark, "Physical Protection of Cryptographic Devices," Lecture Notes in Computer Science. Advances in Cryptology-EUROCRYPT '87, pp. 83-93 (Apr. 13-15, 1987).
Coleman et al., "Mass Storage System Reference Manual: Version 4," Technical Committee on Mass Storage Systems and Technology, IEEE, pp. 1-38, May 1990.
Comba, "Approaches to Cryptographic Key Management," Symposium on Applied Computing. Proceedings of the Northeast ACM Symposium on Personal Computer Security, pp. 38-45 (1986).
Denning, "Cryptography and Data Security," Addison-Wesley Publishing Co., pp. 164-169 and 179, 1982.
Di Crescenzo, et al., "How to Forget a Secret (Extended Abstract)," 16th Annual Symposium on Theoretical Aspects of Computer Science, pp. 500-509 (Mar. 4-6, 1999).
Dietrich, "Security Enclosure With Elastomeric Contact Stripes, " IBM Technical Disclosure Bulletin, pp. 444-445, Feb. 1991.
"Disappearing Inc. Makes Old Email Vanish Everywhere; Reduces Corporate Liability as well as Improves Corporate Productivity by Enabling Sensitive Communications via Email-Company Business and Marketing," Edge: Work-Group Computing Report, http://findarticles.com/p/articJes/mLmOWUB/is_1999_0cU 1/aL 56260487/print (Oct. 11, 1999).
Double, "Encryption Key Security by Electric Field Destruction of Memory Cells," IBM Technical Disclosure Bulletin, pp. 8-11, Jan. 1989.
FIPS PUB 74, "Federal Information Processing Standards Publication 1981 Guidelines for Implementing and Using the NBS Data Encryption Standard," Federal Information Processing Standards Publication 74, National Institute of Standards and Technology, Apr. 1, 1981, 39 pages.
FIPS PUB 140-1, "Security Requirements for Cryptographic Modules," Federal Information Processing Standards Publication 140-1, National Institute of Standards and Technology, Jan. 11, 1994, 44 pages.
Flavin, et al., "Data Protection on Magnetic Media Via an Encrypting Controller," IBM Technical Disclosure Bulletin, vol. 3D, No. 3, pp. 1284-1285 (Aug. 1987).
Garfinkel, S., "PGP: Pretty Good Privacy," O'Reilly & Associates, pp. 54-55, 151-153, 168-169, Jan. 1995.
Garfinkel, S., "Omniva's Self-Destructing Email," Web Security, Privacy and Commerce, Second Edition, O'Reilly & Associates, Inc., Sebastopol, CA, pp. 280-283, Jan. 2002.
Gobioff, Howard, et al., "Security for Networked Attached Storage Devices," Carnegie Mellon University Computer Science Technical Report CMU-CS-97-185, Oct. 1997, 20 pages.
Gobioff, Howard, "Security for a High Performance Commodity Storage Subsystem," Carnegie Mellon University Computer Science Technical Report CMU-CS-99-160, Jul. 1999, 222 pages.
Gobioff, Howard, et al., "Smart Cards in Hostile Environments," Proceedings of the Second USENIX Workshop on Electronic Commerce, pp. 23-28 (Nov. 18-21. 1996).
Graham, et al, "Data Protection at the Volume Level," IBM Technical Disclosure Bulletin, pp. 146-148, Oct. 1988.
Gutmann, "Secure Deletion of Data from Magnetic and Solid-State Memory," Proceedings of the Sixth Annual USENIX Security Symposium: Focusing on Applications of Cryptography, pp. 7-89 (Jul. 22-25, 1996).
Hwang, et al., "An Access Control Scheme Based on Chinese Remainder Theorem and Time Stamp Concept," Computers & Security, vol. 15. No. 1 . pp. 73-81,1996.
IBM Crypto Server Management General Information Manual, First Edition (May 2000), 16 pages.
IBM SecureWay Cryptographic Products IBM 4758 PCI Cryptographic Coprocessor Installation Manual, Security Solutions and Technology Department, Second Edition (Mar. 2000), 34 pages.

IBM SecureWay, UltraCypher Cryptographic Engine (Datasheet) (1998), 2 pages.

IBM 4758 PCI Cryptographic Coprocessor Custom Software Installation Manual, Second Edition, Jan. 2001, 30 pages.

Avoid Litigation: Encrypt Your Data, InfoTech Research Group, Sep. 19, 2006, 6 pages.

Johnson et al., "Self-Destructing Diskette," IBM Technical Disclosure Bulletin, vol. 33, No. 1A, pp. 218-219 (Jun. 1990).

Mallett, "Considerations for Applying Disk Encryptors 10 Environments Subject to Hostile Overrun," IEEE, pp. 218-222, 1991.

Mauriello, "TCFS: Transparent Cryptographic File system," LINUX Journal, Aug. 1, 1997, 8 pages.

Moore, "Preventing Access to a Personal Computer," IBM Technical Disclosure Bulletin, pp. 98-100, Sep. 1992.

Omniva Policy Systems, www.omniva.com, (Aug. 2004), downloaded from web.archive.org on Aug. 24, 2004, 19 pages.

Provos, Niels, "Encrypting Virtual Memory," CITI Technical Report 00-3, Center for Information Technology Integration, University of Michigan, Apr. 25, 2000, 11 pages.

Scherzer. "Memory Protection in Chip Cards," IBM Technical Disclosure Bulletin, pp. 416-417, Oct. 1989.

Slusarczuk et al., "Emergency Destruction of Information Storage Media," Institute for Defense Analysis, IDA Report R-321 , Dec. 1987, 196 pages.

Smith, "Verifying Type and Configuration of an IBM 4758 Device: A While Paper," IBM T.J. Watson Research Center pp. 1-7 (218/00).

Smith et al., "IBM Research Report: Building a High-Performance, Programmable Secure Coprocessor," IBM Research Division, Computer Science/Mathematics, RC 21102(94393) (Feb. 19, 1998), 61 pages.

Stinson, Douglas R., "Cryptography: Theory and Practice," CRC Press, Mar. 1, 1995, 228 pages.

Vernam, "Cipher Printing Telegraph Systems for Secret Wire and Radio Telegraphic Communications," Journal of the AI EE. pp. 109-115, Feb. 1926.

Weingart, "Physical Security for the uABYSS System," Proceedings 1987 IEEE Symposium on Security and Privacy, pp. 2-58 (Apr. 27-29, 1987), pp. 52-58.

Whitten et al., "Usability of Security: A Case Study," CMU Computer Science Technical Report CMU-CS-98-155. pp. 1-39, Dec. 18, 1998.

Yee et al., "Secure Coprocessors in Electronic Commerce Applications," Proceedings of the First USENIX Workshop of Electronic Commerce, pp. 155-170, Jul. 11-12, 1995.

Yeh et al., "S/390 CMOS Cryptographic Coprocessor Architecture: Overview and Design Considerations," IBM J. Res. Develop., vol. 43, No. 5/6, pp. 777-794 (Sep./Nov. 1999).

Zadok et al., "Cryptfs: A Stackable Vnode Level Encryption File System," Computer Science Department, Columbia University, CUCS-021-98, pp. 1-14, Jun. 1998.

* cited by examiner

BACKGROUND ENCRYPTION OF DISKS IN A LARGE CLUSTER

BACKGROUND OF THE INVENTION

TECHNICAL FIELD

The invention relates to storage encryption devices. More particularly, the invention relates to the background encryption of disks in a large cluster.

DESCRIPTION OF THE PRIOR ART

The advantages of networked data storage technologies such as Network Attached Storage (NAS) and Storage Area Networks (SAN) are well established, but storing an organization's data on a network creates significant security risks. Technologies, such as NAS and SAN, that aggregate data in a storage network can improve scalability, manageability, and access to critical data, while substantially reducing the total cost of storage. Additionally, storage networks can simplify the process for enterprises seeking to implement comprehensive disaster recovery programs. However, data in networked storage environments is significantly more vulnerable to unauthorized access, theft, or misuse than data stored in more traditional, direct-attached storage. Aggregated storage is not designed to compartmentalize the data it contains, and data from different departments or divisions becomes co-mingled in the network. Data backup, off-site mirroring, and other disaster recovery techniques increase the risk of unauthorized access from people both inside and outside the enterprise. Partner access through firewalls and other legitimate business needs also create undesirable security risks. With storage networks, a single security breach can threaten the data assets of an entire organization.

Technologies such as firewalls, Intrusion Detection Systems (IDS), and Virtual Private Networks (VPN) seek to secure data assets by protecting the perimeter of the network. While important in their own right, these targeted approaches do not adequately secure storage. Consequently, they leave data at the core dangerously open to both internal and external attacks. Once these barriers are breached, e.g. via stolen passwords, uncaught viruses, or simple misconfiguration, data assets are fully exposed.

It is known to secure networked storage by protecting data both in transit and stored on disk. The Decru DataFort™ product is an example of an encryption appliance that fits transparently into NAS or SAN environments, securely encrypting and decrypting data at wire-speed.

One aspect of such storage security appliances is the creation, issuance, and maintenance of security keys, as well as such actions as are necessary in connection with the use of security keys, e.g. rekeying. The rekeying process is used to change the security key that is used to read data stored by the storage security appliance on a disk. The process takes a large disk, breaks it up into small, e.g. 256 k segments, and temporarily blocks access to that segment. While it is blocking access, it reads in that segment, decrypts it, re-encrypts it with a new key, and then writes it back onto the disk. The rekeying process does this across the entire disk.

If it is necessary to communicate with the other cluster members for each segment of the disk, the rekeying procedure requires a considerable amount of communication for a very large disk. In this regard, some limitations are found in the present generation of storage security appliances. For example, the current method for rekeying only allows two cluster members to participate. This limitation may make current storage security appliances inadequate for modern storage devices which might have many more than two ports connected to a storage medium. If each port requires a separate storage security appliance acting as an encryption proxy, then a more scalable method is needed.

It would be advantageous to provide a storage encryption device that allows for the background encryption of modern storage media while allowing servers to have access to the partially encrypted disks associated with such media.

It would be further advantageous to provide a large cluster rekeying algorithm that minimizes the amount of communication needed as a disk is rekeyed.

SUMMARY OF THE INVENTION

The invention provides for rekeying a large cluster of storage security appliances which allows more than two of the storage security appliances to proxy a single storage medium while encrypting the storage medium in a manner that is transparent to any attached server. The invention provides a method for synchronizing encryption of the disk pursuant to rekeying among a large cluster of storage security appliances, while allowing all of the storage security appliances involved to access the storage device being rekeyed in a secure fashion. This is accomplished by designating one of the storage security appliances as a master, the other storage security appliances being slave devices. The master broadcasts a block request to the slaves, requesting the slaves block their access to a region of the storage device to be rekeyed. Once blocked, the master can rekey this region. The slaves retain their access to all other regions of the storage device. This process continues on a region-by-region basis until the storage device is entirely rekeyed.

DETAILED DESCRIPTION OF THE INVENTION

Figure 1:
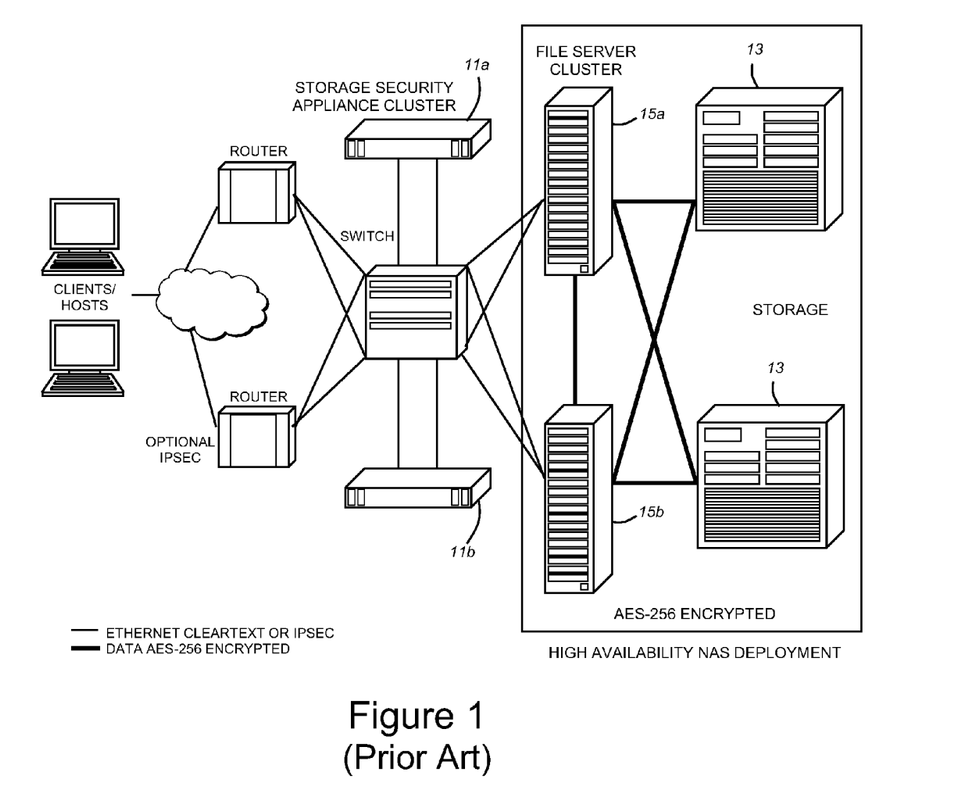
FIG. 1 is a block schematic diagram that illustrates a simple, high-availability storage security appliance deployment in a networked environment.

FIG. 1 is a block schematic diagram that illustrates a simple, high-availability storage security appliance deployment in a networked environment. By encrypting data, and routing all access through secure hardware, the storage security appliance 11a, 11b makes it easier for organizations to control and track data access between storage media 13 and attached servers 15a, 15b. Encryption effectively blocks all back doors to data, thus protecting sensitive information on disk or tape against theft or misuse. Even if an unauthorized person gains access to the media, they only see meaningless characters.

The invention addresses the above-mentioned problems attendant with the rekeying of large clusters of storage security appliances. Such storage security appliances provide for the creation, issuance, and maintenance of security keys, as well as actions that are necessary in the connection with the use of security keys, such as rekeying. Rekeying is a preferred technique for maintaining a high level of security. By periodically changing the keys i.e. rekeying, used by the storage security appliances, it is possible to assure that keys are not compromised. The rekeying process is also helpful in the event there is a compromise of security. In the presently preferred embodiment of the invention, the rekeying process takes a large disk and breaks it into small segments, which in the preferred embodiment are always 256 k segments. Of course, any other size segment is possible as long as rekeying is permitted. During rekeying, access to the segments that are being rekeyed is temporarily blocked. While access is blocked, the segment is read, decrypted, and reencrypted, with the new key. The segment is then written back to the disk. This process of rekeying is applied the entire disk. The invention provides a technique that performs this process while otherwise allowing access to the disk. This rekeying is referred to herein as background encryption because it takes place while the disk is otherwise accessible, i.e. it takes place in the background.

The invention operates within a known architecture, such as is shown in FIG. 1, and provides for the rekeying of large clusters of storage security appliances. The invention thus allows more than two storage security appliances to proxy a single storage medium while encrypting the storage medium in a manner that is transparent to an attached server. As discussed in greater detail below, the invention effectively synchronizes disk encryption among a large, e.g. up to 32 devices in the presently preferred embodiment, cluster of storage security appliances, while allowing all of the storage security appliances involved to provide secure access to the storage device being rekeyed. The invention thus ensures that server access is completed with the correct encryption key as will become apparent from the following discussion. In this way, the invention also reduces the amount of communication required among the involved storage security appliances.

In the presently preferred embodiment of the invention, one of the storage security appliances is designated the master device. The manner in which this designation is made is discussed in greater detail below. A broadcast message is sent within a cluster of storage security appliances from the master storage security appliance to each other, i.e. slave, storage security appliance in the cluster requesting the slave appliances to block their access to a particular region of the storage medium. A typical block message is as follows:

```
typedef struct dfc_ck_progress_notify_t
{
    lba_t     block_start;      // Start lba of the area to be blocked
    lba_t     block_end;        // End lba of the area to be blocked
    u_int8_t  scratch_block;    // non-zero if the scratch area is to
                                   be blocked
    u_int8_t  ckdone;           // non-zero if the change key if finished
    u_int8_t  slv_open;         // non-zero if the slave should open access
                                   to the drive
    int       count;            //how many times this message has been sent
} dfc_ck_progress_notify_t;
```

Responsive to this broadcast message, the slaves block a region of the storage medium that they would otherwise be able to access. The slaves respond to the master, indicating that they have blocked a region of the storage medium. A typical response is as follows:

The same data structure is used as a response. The meaning of the fields are changed.

```
typedef struct dfc_ck_progress_notify_t
{
    lba_t     block_start;      // Start lba of the area that has been
                                   blocked
    lba_t     block_end;        // End lba of the area that has been blocked
    u_int8_t  scratch_block;    // non-zero if the scratch area is blocked
    u_int8_t  ckdone;           // non-zero if the change key is finished
    u_int8_t  slv_open;         // non-zero if the slave has opened access
                                   to the drive
    int       count;            //how many times this message has been sent
} dfc_ck_progress_notify_t;
```

After the master has received this block message from the slaves, it knows that the hosts that are attached to the slaves cannot access this region anymore. The master is then free to re-encrypt the blocked region of the storage medium. The master decrypts this region and then, after it has reencrypted the region, the master sends out additional blocked region messages. Thus, the invention provides a mechanism by which the master broadcasts a message to all of the slaves in the cluster telling them to block a certain portion of the disk. Once this is done, then none of the attached servers can access that region of the disk, and the master is free to perform reencryption, i.e. the master is free to rekey that region of the disk.

The presently preferred embodiment of the invention operates in connection with a storage security appliance. One example of such device is the Decru DataFort™ manufactured by Decru (Redwood City, Calif.). A security appliance encrypts network data in transit to storage, providing authentication, fine grain access controls, and secure logging in the process. Such an appliance also supports the creation of secured storage targets, in which encrypted data are stored. Data remains encrypted while stored in a vault, protected from unauthorized access. When data are requested by an authorized host, the storage security appliance decrypts it, then forwards it to the appropriate network destination. The invention herein operates in connection with, for example, encrypted network storage for NAS, SAN, and IP networks. The preferred embodiment is readily applied to the main types of storage architecture. This includes applications of storage security appliances that secure file-based data in Network Attached Storage (NAS) systems, and that are used on the file server side of a SAN (Storage Area Network) when file and user level control is desired for SAN encryption. Such storage security appliances may also support Network File System (NFS) and Common Internet File System (CIFS) protocols. They can also secure block-or sector-based data over IP networks that support the iSCSI protocol. Such storage security appliances can also secure block-or sector-based data in Fibre Channel networks, such as SCSI over Fibre Channel (usually referred to as a SAN). Such storage appliances can also secure block-based data in Fibre Channel tape backup environments.

When installed between hosts and storage, the exemplary storage security appliance encrypts data en route to storage devices and decrypts data that are read from storage by hosts, without impact on the existing network structure. Standard installation places the storage security appliances in a clustered configuration on a single network, providing automatic failover protection, with all encryption key and access control information shared securely between the cluster members. An administrator is typically provided for in such systems. The administrator has direct access to essential network setup and maintenance tasks by means of web-based management interface. In one embodiment, key security administration tasks, including those needed to manage all members of a cluster, can be accessed using a management tool from a single workstation.

One feature of a storage security appliance is that of a trustee which is a remote storage security appliance with which a trust relationship has been formed. This allows exportable encryption keys to be shared between storage security appliances. Creating trustees allows vaults, tape, and pool keys to be shared between may not be on the same network. A trustee may import keys from or export keys to another trustee. Imported keys cannot be exported once they are imported.

An advantage of the invention is that it allows large clusters of storage security appliances to proxy storage devices and encrypt them at the same time. For example with reference to a typical installation, as shown on FIG. 1, a user having administrative privileges in connection with an eight-port storage array, for example storage devices 13, could install eight storage security appliances in a cluster 11a/11b and continue to access the storage media through the storage security appliances. At some later time the user could decide to encrypt the storage media using the invention. The attached servers could then still access the storage media while the media were being encrypted, with minimal impact to performance and availability of the system. This is because the invention, provides that the master encrypts only the blocked region of the storage medium, while all other regions remain accessible for data operations. Because all of the storage security appliances in the cluster block the same region, the rekeying is synchronized. That is, the master proceeds with rekeying on a segment-by-segment basis, where each slave blocks a currently rekeyed segment. Deployed correctly, the invention enables the storage security appliance to be implemented on multi-port storage media without interruption to the attached servers. Automatic failover of the rekeying process, described above, among the clustered storage security appliances reduces administration time, thus allowing the process to run on a wide variety of media devices without user intervention.

The presently preferred embodiment for rekeying large clusters operates on any operating system, such as Unix and Microsoft-based operating systems. The presently preferred embodiment operates on an operating system that runs on the storage security appliance. The rekeying process is controlled by the user. Thus, the user decides when to rekey a particular disk drive. In the preferred embodiment, a management server selects a member of the storage security appliance cluster with access to the drive to be rekeyed. For example, an arbitrary selection process may be employed that includes pseudo random generation and selection of one of the storage security appliances in the cluster. This storage security appliance is now the master of the rekeying process. The remaining storage security appliances in the cluster are slaves to that storage security appliance. The master may be selected in other ways, as would be apparent to the skilled in the art.

Figure 2A:
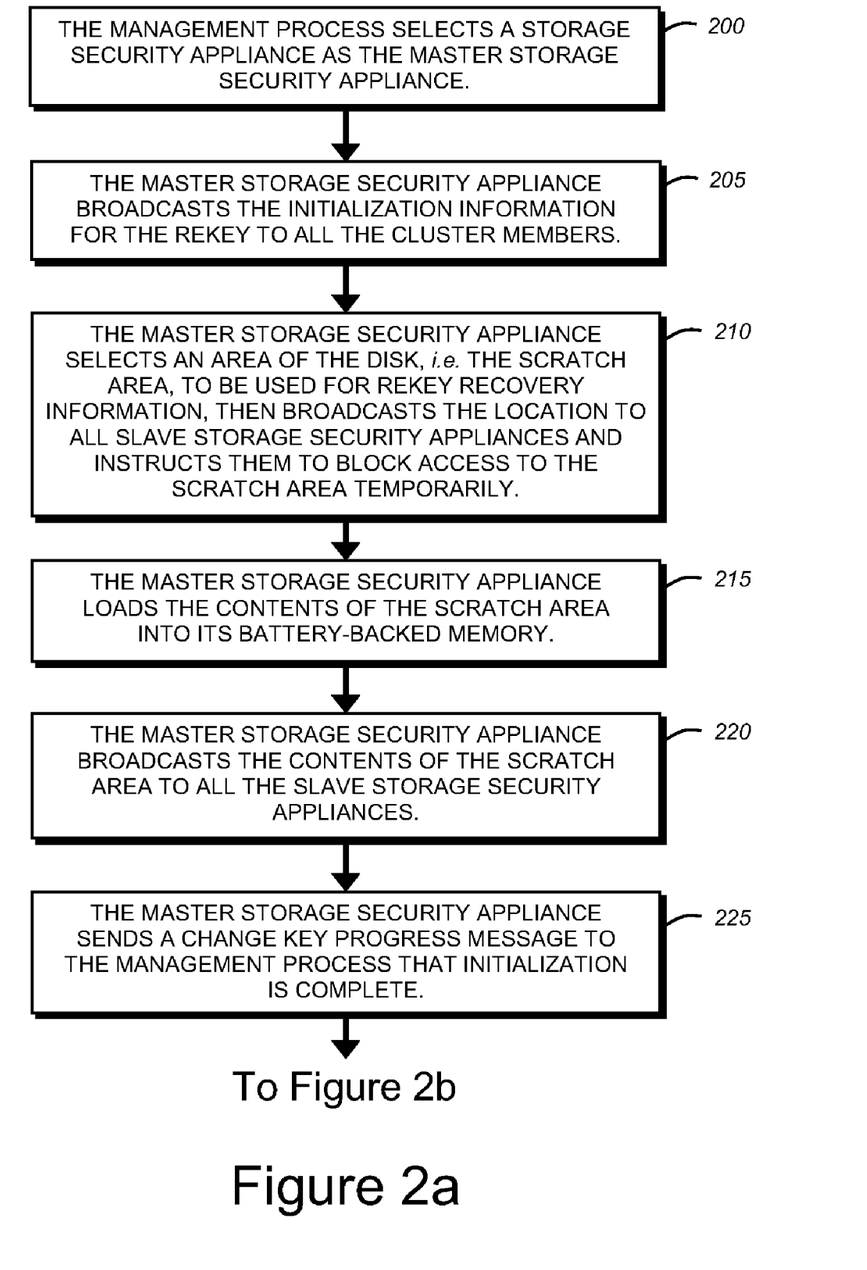
FIGS. 2a and 2b provide a flow diagram showing the phases of the rekeying process for the master storage security appliance according to the invention.
Figure 2B:
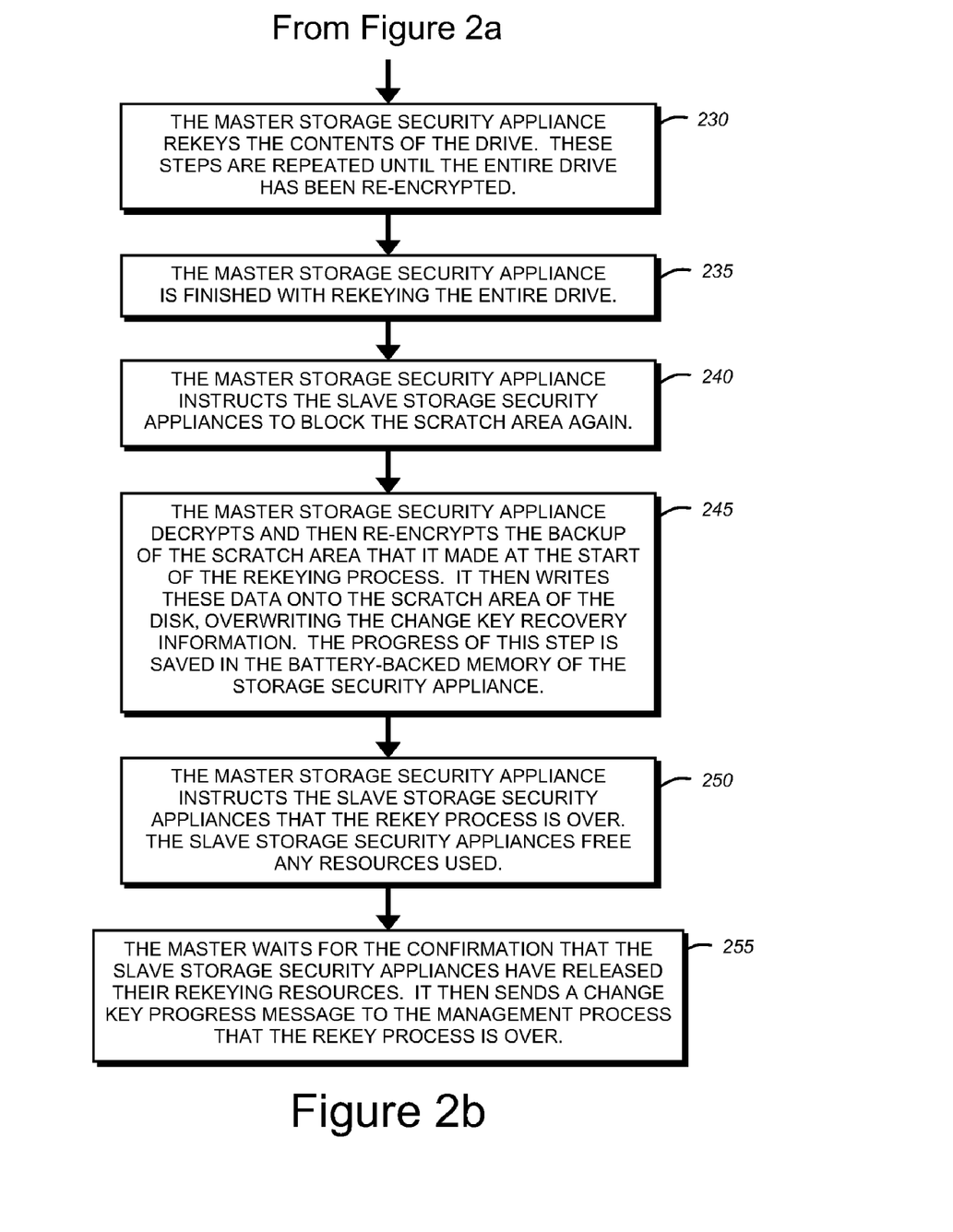

A presently preferred implementation of the rekeying process for the master storage security appliance proceeds as follows (see FIGS. 2a and 2b):

The management process, operating in any of the storage security appliances in the cluster, selects a storage security appliance as the master storage security appliance (200). The master storage security appliance then broadcasts the initialization information for the rekey to all the cluster members (205). The master storage security appliance receives confirmation from all the slave storage security appliances that they have received the initialization information. The master storage security appliance then selects an area of the disk, i.e. the scratch area (a 2 MB region at the end of the disk), to be used for rekey recovery information, broadcasts this location to all slave storage security appliances, and instructs them to block access to the scratch area temporarily (210). Once this is done, the master storage security appliance receives confirmation from all the slave storage security appliances that they have received the location of the scratch and are blocking host access to the area.

Figure 3:
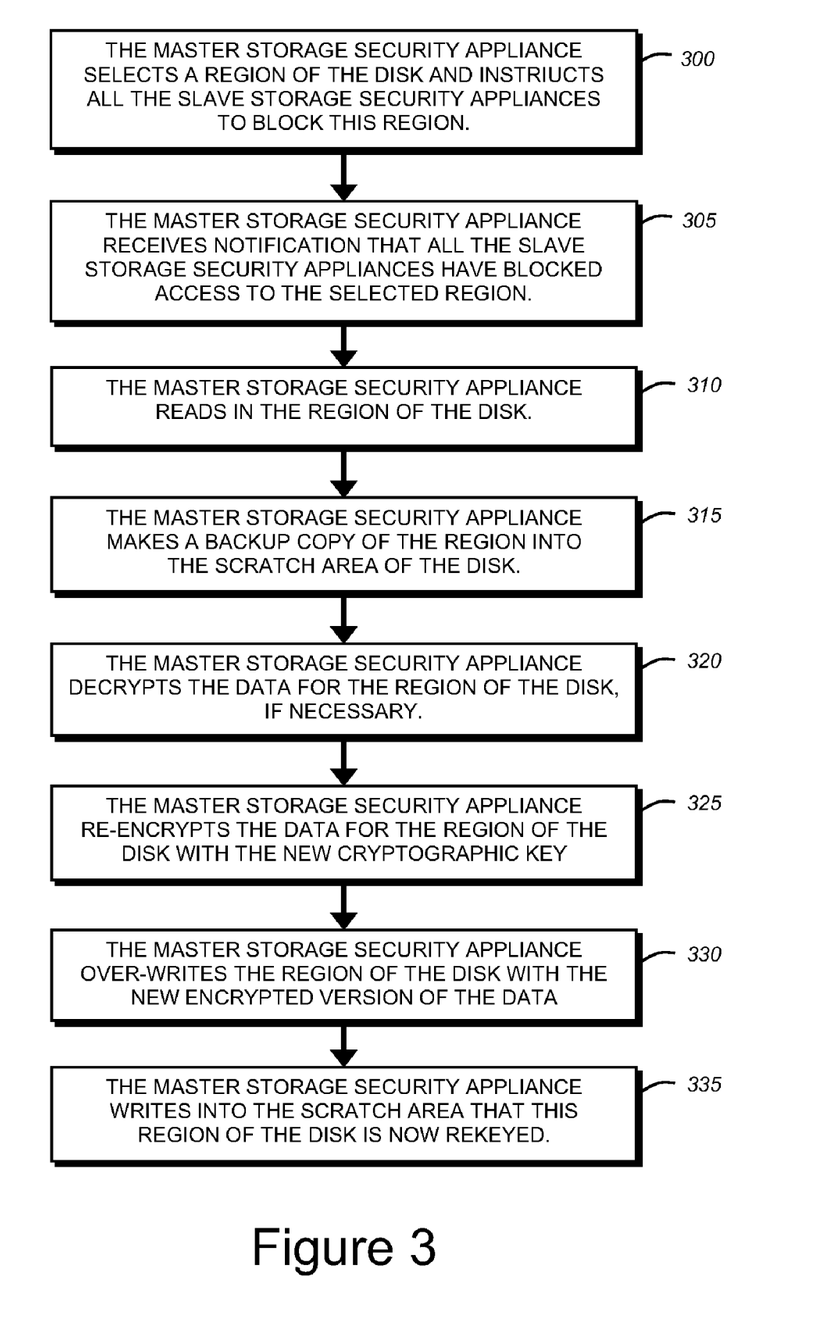
FIG. 3 is a flow diagram showing the sub steps involved when a master storage security appliance is rekeying the contents of a drive according to the invention.

The master storage security appliance then loads the contents of the scratch area into its non-volatile memory, e.g. a battery-backed memory (215). After the master storage security appliance has finished loading the contents of the scratch to its battery-backed memory, the master storage security appliance broadcasts the contents of the scratch area to all the slave storage security appliances (220). The slave storage security appliances receive the contents of the scratch area; and the master storage security appliance receives confirmation from all the slave storage security appliances that the contents of the scratch area were received. The master storage security appliance then sends a change key progress message to the management process which indicates that initialization is complete (225). The master storage security appliance has received an acknowledgement from the management process that it received the change key progress message. The master storage security appliance rekeys the contents of the drive. Rekeying is discussed in greater detail below and in connection with FIG. 3. The following steps are repeated until the entire drive has been re-encrypted (230):

The master storage security appliance selects a region of the disk and instructs all of the slave storage security appliances to block this region (300). In addition, the slave storage security appliances attempt to block as much of the area extending past this region as possible, depending on host access patterns.

When the master storage security appliance rekeys the next region of the disk, if a slave storage security appliance has already blocked the new region, then this step becomes unnecessary for that slave storage security appliance. This greatly reduces the clustered network traffic needed to rekey in large clusters. The master storage security appliance receives notification that all the slave storage security appliances have blocked access to the selected region (305). The master storage security appliance is also notified if any of the slave storage security appliances have blocked more than the requested region.

The master storage security appliance then reads in the region of the disk (310). After the master storage security appliance has finished reading in the region of the disk, the master storage security appliance makes a backup copy of the region into the scratch area of the disk (315). After the master storage security appliance finishes writing the backup to the scratch area, the master storage security appliance decrypts the data for the region of the disk, if necessary. If the disk is currently unencrypted, then this step is skipped (320).

Once the master storage security appliance has finished decrypting this region of the disk, the master storage security appliance re-encrypts the data for the region of the disk with a new cryptographic key. If the disk is being decrypted this step is not necessary (325). Once the master storage security appliance has finished encrypting this region of the disk, the master storage security appliance over-writes the region of the disk with the new encrypted version of the data (330). The master storage security appliance finishes over-writing the region of the disk, and the master storage security appliance writes into the scratch area that this region of the disk is now rekeyed (335). The master storage security appliance is now finished with the step 230 of FIG. 2a/2b.

Returning now to FIGS. 2a and 2b for the following discussion, the master storage security appliance is now finished with rekeying the entire drive (235). The master storage security appliance instructs the slave storage security appliances to block the scratch area again (240) using the dfc_ck_progress_notify_t messages described earlier. The master storage security appliance receives confirmation that the slave storage security appliances have temporarily blocked the scratch area. The master storage security appliance decrypts and then re-encrypts the backup of the scratch area that it made at the start of the rekeying process. It then writes these data onto the scratch area of the disk, overwriting the change key recovery information. The progress of this step is saved in a battery backed memory of the storage security appliance so that it can recover if this step is interrupted (245). Those skilled in the art will appreciate that this progress information may be saved by other means, such as flash memory and the like.

Once final writing of the scratch area is complete, the master storage security appliance instructs the slave storage security appliances that the rekey process is over. The slave storage security appliances free any resources used (250). The master waits for the confirmation that the slave storage security appliances have released their rekeying resources. It then sends a change key progress message to the management process that the rekey process is over (255). The master waits for management process confirmation that it received the change key progress message.

State Machine

Figure 4:
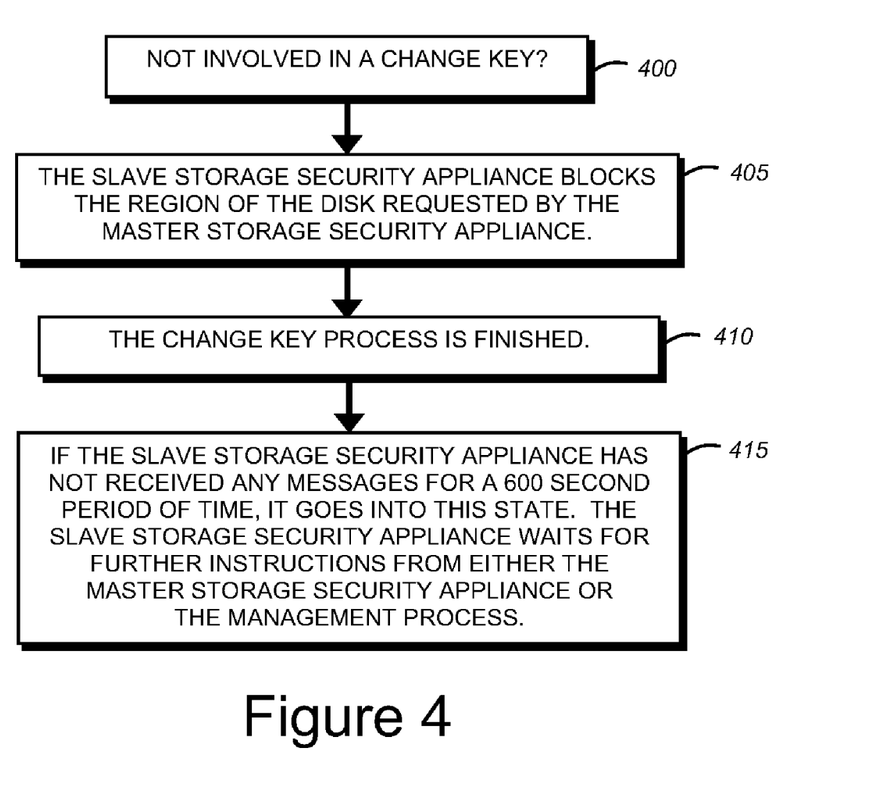
FIG. 4 is a flow diagram showing a simple state machine executed by the slave storage security appliances according to the invention.

During operation of the invention, the slave storage security appliances execute a simple state machine (see FIG. 4):

The slave machines are idle if they are not involved in a change key (400). However, in the preferred embodiment slave storage security appliances are usually in a state in which the slave storage security appliance is blocking the region of the disk requested by the master storage security appliance (405). A further state indicates that the change key process has been finished (410). Finally, if the slave storage security appliance has not received any messages for a predetermined interval, which in the preferred embodiment is a 600 second period of time, it goes into an error state. The slave storage security appliance then waits for further instructions from either the master storage security appliance or management process (415).

Error Recovery

Figure 5:
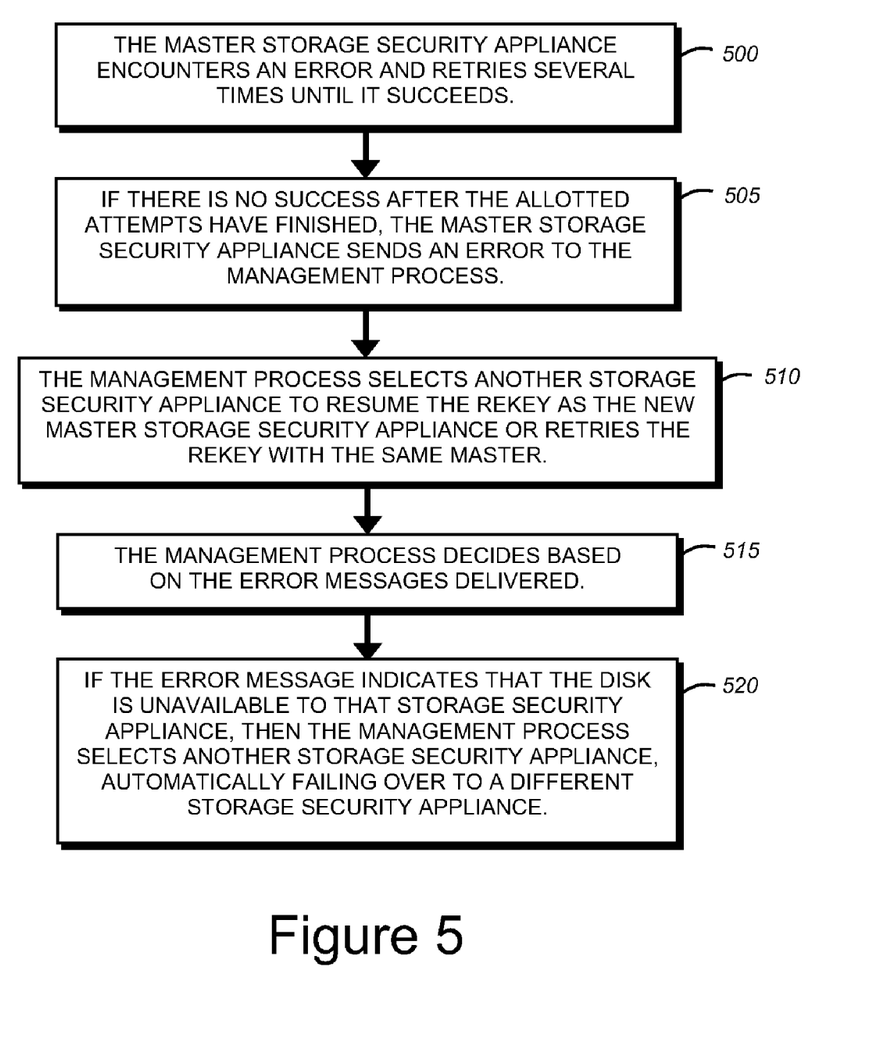
FIG. 5 is a flow diagram showing error recovery according to the invention.

FIG. 5 is a flow diagram showing error recovery according to the invention.

If the master storage security appliance encounters an error at any step it retries several times until it succeeds (500). If there is no success after the allotted number of attempts have finished, the master storage security appliance sends an error message to the management process (505). The management process can then select another storage security appliance to resume the rekey as the new master storage security appliance or retry the rekey with the same master (510). The management process decides based on the error messages delivered (515). For example, if the error message indicates that the disk is unavailable to that storage security appliance, then the management process selects another storage security appliance, automatically failing over to a different storage security appliance (520). This is a major improvement over prior art cluster error recovery, which does not recover from this situation at all and requires the user to move the active path of the disk to the master storage security appliance.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for encrypting a disk, the disk accessible by a plurality of storage security appliances, and the disk accessed via a storage system, comprising:
    selecting one of the storage security appliances as a master, and designating all the other storage security appliances as slaves;
    sending, by the master, a first message to each slave, the first message comprising:
        (i) a location of a first area of the disk, and
        (ii) an instruction to block access to the first area; and
    receiving, by the master, in response to the first message, a second message comprising a location of a second area of the disk designated as blocked from access by a slave, where the second area extends past the first area, and where the slave permits access to unblocked areas of the disk;
    encrypting, by the master, the contents of the disk, starting with the first area and proceeding on an area-by-area basis, until the entire disk is encrypted;
    sending, by the master, a third message to each slave, the third message comprising an instruction to block access to a rekey recovery area of the disk;
    decrypting and then re-encrypting, by the master, a backup of the rekey recovery area of the disk;
    overwriting, by the master, the rekey recovery area of the disk;
    sending a fourth message, by the master, to each slave, the fourth message comprising a notice that encryption of the disk is terminated.

2. The method of claim 1, further comprising loading, by the master, contents of the rekey recovery area into a non-volatile memory.

3. The method of claim 2, wherein status of overwriting the rekey recovery area is saved in the non-volatile memory.

4. The method of claim 1, wherein encrypting further comprises:
    encrypting the area of the disk within the second area that extends beyond the first area.

5. The method of claim 1, wherein access provided by the slaves uses a protocol chosen from a group of protocols consisting of CIFS, NFS, iSCSI, and SCSI over Fiber Channel.

6. The method of claim 1, further comprising:
    in response to an error, the master retrying sending, receiving and encrypting.

7. The method of claim 1, further comprising:
    in response to an error indicating the disk is not available, selecting another storage security appliance as master.

8. A cluster of storage security appliances for encrypting a disk, the disk accessed via a storage system the cluster comprising:
    a plurality of slave storage security appliances (slaves);
    a master storage security appliance (master), the master configured to:
        send a first message to each slave, the first message comprising:
            (i) a location of a first area of the disk, and
            (ii) an instruction to block access to the first area;
        receive a second message in response to the first message, the second message comprising a location of a second area of the disk designated as blocked from access by a slave, where the second area extends past the first area, and where the slave permits access to unblocked areas of the disk; and encrypt the contents of the disk, starting with the first area and proceeding on an area-by-area basis, until the entire disk is encrypted;

send a third message to each slave, the third message comprising an instruction to block access to a rekey recovery area of the disk;

decrypt and then re-encrypt a backup of the rekey recovery area of the disk;

overwrite the rekey recovery area of the disk;

send a fourth message to each slave, the fourth message comprising a notice that encryption of the disk is terminated.

9. The cluster of claim 8, wherein the master further comprises:

a non-volatile memory loaded with the contents of a rekey recovery area on the disk.

10. The cluster of claim 8, further comprising:

a management process for selecting the master from among the cluster of storage security appliances.

11. The cluster apparatus of claim 8, wherein each slave further comprises:

a state machine comprising the states of:

an idle state where the slave provides proxy access to the disk;

a block state where the slave blocks a region of the disk requested by the master;

a done state where encryption of the disk is terminated; and an error state where the slave has not received any messages for a predetermined period of time, and the slave awaits further instructions.

12. An apparatus for encrypting a disk, the disk accessible by a plurality of systems, and the disk accessed via a storage system, the apparatus comprising a memory and configured to:

send a first message to each system, the first message comprising:

(i) a location of a first area of the disk, and (ii) an instruction to block access to the first area;

receive a second message in response to the first message, the second message comprising a location of a second area of the disk designated as blocked from access by the system, where the second area extends past the first area, and where the system providing access to unblocked areas of the disk;

encrypt the contents of the disk, starting with the first area and proceeding on an area-by-area basis, until the disk is encrypted;

send a third message to each system, the third message comprising an instruction to block access to a rekey recovery area of the disk;

decrypt and then re-encrypt a backup of the rekey recovery area of the disk;

overwrite the rekey recovery area of the disk;

send a fourth message to each system, the fourth message comprising a notice that encryption of the disk is terminated.

13. The apparatus of claim 12, further comprising:

a non-volatile memory loaded with the contents of the rekey recovery area of the disk.

14. The apparatus of claim 13, wherein status is stored in the non-volatile memory of the execution of the program instructions that overwrite the rekey area of the disk.

15. The apparatus of claim 12, the step of encrypting further comprising:

encrypting the area of the disk within the second area that extends beyond the first area.

16. The apparatus of claim 12, wherein access provided by the systems uses a protocol chosen from the group of protocols consisting of CIFS, NFS, iSCSI, and SCSI over Fiber Channel.

17. The apparatus of claim 12, further comprising:

program instructions that in response to an error, the apparatus is programmed to repeat the program instructions that send, receive and encrypt.

18. The apparatus of claim 12, further comprising:

program instructions that in response to an error indicating the disk is not available, selecting another storage security appliance as master.

19. An apparatus for disk encryption, comprising a memory and configured to:

designate the apparatus as a master;

send a first message to a plurality of slave systems, the message instructing the plurality of slave systems to block access to a rekey recovery area of the disk, the disk accessed via a storage system;

in response to a second message received from all the slaves, broadcast the contents of the rekey recovery area to all the slaves; and encrypt the contents of the disk, starting with a first area and proceeding on an area-by-area basis, until said entire disk is encrypted, where a backup of each area is written to the rekey recovery area prior to encryption of each area;

send a third message to each slave, the third message comprising an instruction to block access to a rekey recovery area of the disk;

decrypt and then re-encrypt a backup of the rekey recovery area of the disk;

overwrite the rekey recovery area of the disk;

send a fourth message to each slave, the fourth message comprising a notice that encryption of the disk is terminated.

20. The apparatus of claim 19, the memory further comprising:

a non-volatile memory loaded with the contents of the rekey recovery area on the disk.

* * * * *

UNITED STATES PATENT AND TRADEMARK OFFICE
CERTIFICATE OF CORRECTION

| | | |
|---|---|---|
| PATENT NO. | : 8,171,307 B1 | Page 1 of 1 |
| APPLICATION NO. | : 11/420723 | |
| DATED | : May 1, 2012 | |
| INVENTOR(S) | : Steven Chang | |

It is certified that error appears in the above-identified patent and that said Letters Patent is hereby corrected as shown below:

In the Claims

In col. 9, line 22 should read:
11. The cluster ~~apparatus~~ of claim 8, wherein each slave Signed and Sealed this
Eleventh Day of June, 2013

Teresa Stanek Rea
*Acting Director of the United States Patent and Trademark Office*